(No Model.)
J. A. WITHROW.
CHECK ROWING ATTACHMENT FOR CORN PLANTERS.
No. 312,783. Patented Feb. 24, 1885.
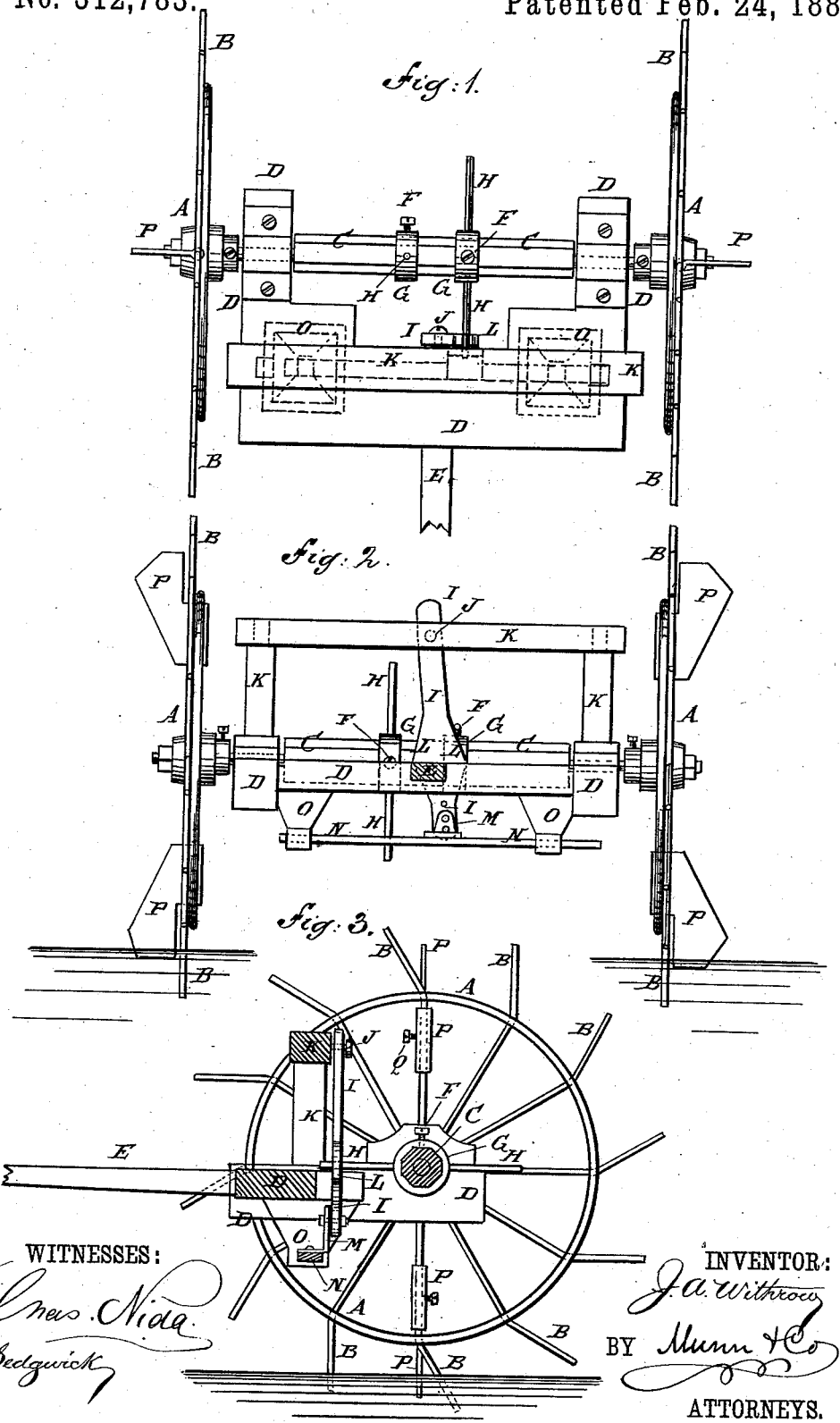

UNITED STATES PATENT OFFICE.

JOSEPH A. WITHROW, OF SCRANTON, IOWA.

CHECK-ROWING ATTACHMENT FOR CORN-PLANTERS.

SPECIFICATION forming part of Letters Patent No. 312,783, dated February 24, 1885.

Application filed August 27, 1884. (No model.)

*To all whom it may concern:*

Be it known that I, JOSEPH A. WITHROW, of Scranton, in the county of Greene and State of Iowa, have invented certain new and useful Improvements in Check-Rowing Attachments for Corn-Planters, of which the following is a full, clear, and exact description.

Reference is to be had to the accompanying drawings, forming part of this specification, in which similar letters of reference indicate corresponding parts in all the figures.

Figure 1 is a plan view of my improvement. Fig. 2 is a front elevation of the same. Fig. 3 is a sectional side elevation of the same.

The object of this invention is to provide a mechanism for operating the seed-dropping slides of corn-planters, so constructed as to operate the said slides with certainty at regular intervals, so that the planting can done in accurate check-row.

The invention consists in the peculiar construction and arrangement of parts, as hereinafter fully described, and pointed out in the claim.

A represents the drive-wheels, which are made with arms B, projecting from their rims to enter the ground, and thus prevent the said wheels from slipping as the machine is drawn forward, the arms B being made of such a length that the rims of the wheels will not come in contact with the ground. The arms B are bent forward at an angle, as shown in Fig. 3, so that they will enter the ground vertically. The wheels A are rigidly attached to the axle C, or are connected with the said axle by set-screws, so that the said wheels will carry the said axle with them in their revolution. The axle C revolves in bearings attached to the side bars of the frame D, the forward end of which is designed to be connected with the frame of any suitable furrow-opener by a draw-bar, E, or other suitable means.

To the middle part of the axle C are secured, by set-screws F or other suitable means, two collars, G, to each of which are attached two (more or less) radial arms, H. The arms H of the two collars G alternate with each other, and are arranged at equal distances apart. The two collars G are placed at such a distance from each other that the arms H of the said collars pass upon the opposite sides of the lever I, swinging upon a pivot, J, attached to the top bar of the vertical frame K, which is attached to the horizontal frame D. Upon the opposite sides of the lever I are formed, or to them are attached, inclined projections L, for the arms H to strike against successively, so that the lever I will be vibrated by the revolution of the axle C. The lower end of the lever I is pivoted to an arm, M, attached to the seed-dropping slide N, which slides in the lower parts of the hoppers O, attached to the horizontal frame D, so that the said seed-dropping slide will be operated by the vibration of the lever I. Several holes are formed in the lever I and arm M, to receive the connecting pin or bolt, so that the throw of the said lever I, and the consequent movement of the said seed-dropping slide, can be regulated, as required. With this construction the lever I will be vibrated from the revolution of the wheels A, and the said wheels A will be prevented from slipping by the arms B, which engage with the ground so that the seed will be dropped at uniform distances apart, and can thus be planted in accurate check-row.

P are the markers, which have sockets or clamps formed upon or attached to their rear edges to receive spokes of the wheels A, and are secured to the said spokes by set-screws Q, so that they can be readily adjusted to enter the ground to any desired depth.

The markers P are designed to be so arranged as to mark the ground opposite the hills, so that the marks will serve as a guide to the driver in crossing the field the next time.

I am aware that the seed-slide has been operated by pins on the axle acting on the forked ends of a lever having its rear end connected to the said seed-slide; and I am also aware that the seed-slide has been operated by a cam-groove in the axle acting on a pin on a swinging bar whose lower end is connected, through the medium of levers, to the seed-slide; and I therefore do not claim such invention.

Having thus described my invention, what I claim as new, and desire to secure by Letters Patent, is—

In a check-row attachment for corn-planters, the combination, with the axle C, the horizontal frame D, the vertical frame K, and the seed-slide N, of the collars G, secured to the axle, and provided with the arms H, and the vibrating lever I, pivoted at its ends to the frame K and the seed-slide, respectively, and provided with the inclined projections L on opposite sides, substantially as herein shown and described.

JOSEPH A. WITHROW.

Witnesses:
DAVID G. CROMWELL,
M. S. PATTIN.